United States Patent
Jakab et al.

(10) Patent No.: US 11,888,752 B2
(45) Date of Patent: Jan. 30, 2024

(54) COMBINING NETWORKING TECHNOLOGIES TO OPTIMIZE WIDE AREA NETWORK TRAFFIC

(71) Applicant: Cisco Technology, Inc., San Jose, CA (US)

(72) Inventors: Loránd Jakab, Cluj (RO); Alberto Rodriguez-Natal, Redwood City, CA (US); Fabio R. Maino, Palo Alto, CA (US); Timothy James Swanson, Westford, MA (US); John Joyce, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/465,699

(22) Filed: Sep. 2, 2021

(65) Prior Publication Data

US 2023/0069689 A1 Mar. 2, 2023

(51) Int. Cl.
*H04L 47/2475* (2022.01)
*H04L 45/302* (2022.01)
*H04L 41/5051* (2022.01)

(52) U.S. Cl.
CPC ...... *H04L 47/2475* (2013.01); *H04L 41/5051* (2013.01); *H04L 45/308* (2013.01)

(58) Field of Classification Search
CPC ............. H04L 47/2475; H04L 41/5051; H04L 45/308
See application file for complete search history.

(56) References Cited

U.S. PATENT DOCUMENTS

| | | | |
|---|---|---|---|
| 10,038,494 B1* | 7/2018 | Paraschis | H04B 10/032 |
| 2015/0319078 A1* | 11/2015 | Lee | H04L 12/6418 370/392 |
| 2017/0300353 A1* | 10/2017 | Yu | H04L 47/76 |
| 2018/0343567 A1 | 11/2018 | Ashrafi | |
| 2020/0162371 A1 | 5/2020 | Musku et al. | |
| 2020/0213932 A1 | 7/2020 | Fallon et al. | |
| 2020/0252234 A1* | 8/2020 | Ramamoorthi | H04L 41/12 |
| 2020/0273314 A1 | 8/2020 | Bordeleau et al. | |
| 2021/0036916 A1 | 2/2021 | Szigeti et al. | |

* cited by examiner

*Primary Examiner* — Abdulkader M Alriyashi
(74) *Attorney, Agent, or Firm* — Lee & Hayes, P.C.

(57) ABSTRACT

Techniques for using application network requirements and/or telemetry information from a first networking technology to enhance operation of a second networking technology and optimize wide area network traffic are described herein. The techniques may include establishing a communication network for use by applications of a scalable application service platform, the communication network including a first networking technology and a second networking technology. In this way, a request to establish a connection for use by an application may be received by the first networking technology. The request may include an indication of a threshold service level of the connection. In response to the request, the first networking technology may determine whether the second networking technology is capable of hosting the connection. If the second networking technology is capable of hosting the connection, the connection may be established such that application traffic is sent or received using the second networking technology.

20 Claims, 5 Drawing Sheets

COMBINING NETWORKING TECHNOLOGIES TO OPTIMIZE WIDE AREA NETWORK TRAFFIC

TECHNICAL FIELD

The present disclosure relates generally to techniques for, among other things, using application network requirements and/or telemetry information from a first networking technology to enhance operation of a second networking technology and optimize wide area network (WAN) traffic.

BACKGROUND

Prices for Wide Area Network (WAN) traffic generally depend on a Service Level Agreement (SLA) required by a user, and prices typically increase as Quality of Service (QoS) parameters increase. However, since not all traffic requires the highest QoS from the WAN, optimizing WAN traffic has a significant effect on the network spending of a business. Software-Defined WAN (SD-WAN) products provide optimization solutions to businesses and, in particular, per-application optimization is an area of interest for businesses deploying SD-WAN solutions. While today's SD-WAN solutions offer some application awareness, this is mostly done by analyzing DNS requests and individual traffic flows. With cloud-native applications distributed across multiple clouds over a Network Service Mesh (NSM), it is becoming even more critical to offer a very granular policy control to optimize network utilization for the various typologies of traffic generated by an application.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various technologies associated with using application network requirements and/or telemetry information from a first networking technology to enhance operation of a second networking technology and optimize wide area network (WAN) traffic. By way of example, and not limitation, a method according to the technologies described herein may include establishing a communication network for use by applications hosted by a scalable application service platform, the communication network including a first networking technology and a second networking technology. In some examples, the method may also include receiving, via an application programming interface (API) associated with the first networking technology, a request to establish a connection for use by a first application to send or receive traffic, the request including an indication of a threshold service level according to which the traffic is to be handled. The method may further include receiving control plane information associated with the second networking technology, the control plane information indicating one or more routes between data plane elements of the second networking technology, the one or more routes being associated with respective service levels. Based at least in part on the control plane information, the method may include at least one of establishing the connection for use by the first application such that the traffic is sent or received using a first route of the one or more routes, the first route associated with a first service level that meets or exceeds the threshold service level; or sending, to a controller associated with the first application, a message indicating that the connection cannot be established such that the traffic is handled according to the threshold service level.

Additionally, the techniques described herein may be performed as a method and/or by a system having non-transitory computer-readable media storing computer-executable instructions that, when executed by one or more processors, performs the techniques described above.

Example Embodiments

As discussed above, prices for Wide Area Network (WAN) traffic generally depend on a Service Level Agreement (SLA) required by a user, and prices typically increase as Quality of Service (QoS) parameters increase. However, since not all traffic requires the highest QoS from the WAN, optimizing WAN traffic has a significant effect on the network spending of a business. Software-Defined WAN (SD-WAN) products provide optimization solutions to businesses and, in particular, per-application optimization is an area of interest for businesses deploying SD-WAN solutions. While today's SD-WAN solutions offer some application awareness, this is mostly done by analyzing DNS requests and individual traffic flows.

Additionally, enterprises are increasingly adopting cloud-native technologies for application delivery for, both, internal and external customers. Service meshes are being used in cloud-native application architectures to scale traffic routing and policy enforcement to the needs of complex microservices-based applications, optimize continuous delivery, and provide extensive telemetry information to the mesh operator. A network service mesh (NSM) is a specialized type of service mesh that acts as a layer 2/3 network service that microservices-based applications may use in a cloud-native or hybrid (e.g., cloud-native and monolithic) application environment. However, these NSMs may not have the capability built in to optimize network utilization for the various typologies of traffic generated by an application.

Accordingly, this disclosure describes various techniques for using application network requirements and telemetry information from a first networking technology (e.g., NSM) to enhance operation of a second networking technology (e.g., SD-WAN) and improve WAN network traffic optimization. Specifically, with respect to NSM and SD-WAN, this disclosure includes two approaches to improve effectiveness of both the NSM and the SD-WAN. In the first approach, an existing SD-WAN solution may be used to implement an NSM on top of the SD-WAN. In the second approach, an existing NSM may be used to implement an SD-WAN solution on top of the NSM. Those having ordinary skill in the art will understand that the techniques of this disclosure are not simply the use of one networking technology as transport for the other, but instead the added-value and technological improvements provided by an explicit exchange of information specific to each networking technology that can improve the functionality of the other.

In both of the two approaches, traffic over the WAN can be better optimized when the two technologies are aware of each other, rather than used as ships in the night or individually. The disclosed technologies, among other things, allow a cloud-native application to request network connectivity to on/off-cluster resources with specific QoS characteristics (e.g., data rate, latency, jitter, packet loss, etc.) and leave it to the network to find the best path that could satisfy those requirements.

With respect to the first approach where the existing SD-WAN solution may be used to implement an NSM on top of the SD-WAN, the NSM may be built on top of an SD-WAN deployment using application programming interfaces (APIs) exposed by the SD-WAN management and control-planes. In some examples, The NSM may have points of presence (PoPs) or data-plane elements where the SD-WAN data-plane elements are co-located with NSM resources.

This NSM on top of SD-WAN architecture provides several advantages. First, the NSM may know which logical links have service level agreements (SLAs) and with which parameters, which links are best effort and optimize application traffic granularly (e.g., per microservice, per flow, etc.) according to preference, availability and/or policy. Additionally, operators and administrators of the SD-WAN may receive insights into how certain applications use the network, which can help in root-cause analysis in the case of traffic anomalies, as well as in capacity planning.

As a result, the NSM control-plane API provides applications the possibility to determine if certain SLAs can be met and, in turn, applications can make decisions proactively on how to send data based on available information, rather than trying to determine network performance characteristics with active and/or passive probing and adjusting behavior reactively.

In the architecture of the NSM over SD-WAN solution, an SD-WAN data plane element, may be located in a cloud provider or a data center where a scalable application service platform (e.g., Kubernetes) cluster is hosted for cloud-native applications. In some examples, the NSM may run on the scalable application service platform cluster and expose APIs that allow applications to request specific QoS parameters for their traffic or specify a given software-as-a-service (SaaS) they are interested in connecting to (e.g., Office 365, etc.). In this way, when a request comes in the NSM may either establish a connection to a remote network service endpoint (NSE) over an SD-WAN tunnel meeting the QoS requirements or inform the application that the request cannot be fulfilled.

In some examples, if the request cannot be fulfilled the NSM may offer a connection over a tunnel that is closest to fulfilling the QoS requirements and inform the application of the exact QoS/tunnel characteristics (e.g., read from an SDN controller or vManage). As such, the application may decide to adapt behavior to this lower service level and use the connection offered by NSM. The advantage of this is that the application may know what service level(s) are available and adjust its behavior accordingly.

Additionally, or alternatively, the NSM may trigger one or more appropriate control-plane operations via an API of the SD-WAN to request the SD-WAN to provision a tunnel that meets the application requirements. In some instances, this process may happen dynamically and NSM may automatically release SD-WAN resources when they are no longer needed to meet the requirements of the application.

With respect to the second approach where the existing NSM may be used to implement an SD-WAN solution on top of the NSM, this approach may be appropriate for enterprises that are more advanced in their cloud-native journey. For instance, these enterprises may be using several different cloud providers, data centers, and/or on-premises computing/networking resources, with an existing NSM connecting them for multi-cloud usage. As such, the NSM may be leveraged to create the SD-WAN solution. In some examples, this may require cloud-native, containerized layer-3 network switching/routing solutions (e.g., cloud-native network functions), which may act as the data-plane for the SD-WAN. In some instances, the NSM may monitor several parameters of these data-plane elements and the logical link(s) between them, such as total/available capacity, number and type of flows, latency, jitter, packet loss, and the like. With this approach, a cloud-native, SD-WAN solution may be created on top of an existing, cloud-native NSM such that microservices-based applications may have granular control over the required type of WAN network connectivity.

In the architecture of the SD-WAN over NSM solution, an existing NSM may be running in scalable application service platform clusters hosted in different cloud providers or data centers. In some instances, a cloud-native network function capable of advanced switching/routing may be used as a data-plane element for traffic forwarding between different network service endpoints (NSEs). In at least one example, the way requests from applications work may be the same as in the first approach, with the main difference being that since the data-plane elements are cloud-native, the SDN controller (e.g., SD-WAN controller, vManage, etc.) operation can be integrated into the cloud-native application and the NSM itself This may effectively make NSM the SD-WAN solution. In other words, the SDN controller could be used to orchestrate NSM clients (NSCs) and NSEs to offer an SD-WAN-like solution natively integrated within the application microservices.

Additionally, in the SD-WAN over NSM solution, the solution may expose a familiar API to higher level orchestration and management controllers that sit "on top of" SD-WAN controllers, such as vManage. To build SD-WAN over NSM, the use of these higher level orchestration and management controllers may not necessarily be needed, and a simpler SD-WAN controller component may be created that exposes similar APIs, or APIs that may be standardized in the future for SD-WAN by standard bodies such as MEF.

According to the techniques described in this disclosure, SD-WAN capabilities may be exposed to cloud-native applications such that these applications can explicitly expose their networking needs and, in general, take better advantage of the transport optimizations provided by SD-WAN. The techniques improve the potential level of SD-WAN optimizations by combining information held by both NSM and SD-WAN control and management planes. Additionally, the techniques allow cloud-native applications to use APIs that are well-integrated into the cloud-native ecosystem to request network connectivity with given service levels. The techniques also allow cloud-native applications to adapt to available network connectivity service levels, as well as enable the possibility of dynamic provisioning of SD-WAN resources to meet application networking requirements. Other advantages and improvements in computer-related technology will be easily apparent to those having ordinary skill in the art.

By way of example and not limitation, a method according to the technologies disclosed herein may include establishing a communication network (e.g., wide area network (WAN)) for use by applications hosted by a scalable application service platform (e.g., Kubernetes), the communication network including a first networking technology and a second networking technology. In at least one example, the first networking technology is a network service mesh (NSM) and the second networking technology is a software-defined wide area network (SD-WAN). In other examples, the first networking technology and the second networking technology may include other types of WAN technologies, other types of service mesh technologies, and/or the like.

In some examples, the first networking technology may be built on top of the second networking technology. For instance, the second networking technology may be an existing networking technology. In some examples, the first networking technology may be built on top of the second networking technology using one or more APIs exposed by a control-plane of the second networking technology. Additionally, in some instances, data-plane elements of the second networking technology may include cloud-native network functions that are configured to forward the traffic between endpoints of the first networking technology.

In some examples, the method may include receiving a request to establish a connection for use by a first application to send or receive traffic. In at least one example, the request includes an indication of a threshold service level according to which the traffic is to be handled. For example, the threshold service level may be associated with one or more quality of service (QoS) parameters including one or more of a requested data rate, latency, jitter, packet loss, and/or the like. In some instances, the request may be received from a controller associated with the application and received via an API associated with the first networking technology.

In some examples, control-plane information associated with the second networking technology may be received. The control plane information may indicate one or more routes between data plane elements of the second networking technology that are associated with respective service levels. In some instances, the first networking technology and the second networking technology may exchange control-plane information with one another. For instance, each networking technology may exchange its control-plane information with the other networking technology.

In some examples, based at least in part on the control plane information, the method may include either (i) establishing the connection for use by the first application such that the traffic is sent or received using a first route of the one or more routes, the first route associated with a first service level that meets or exceeds the threshold service level, or (ii) sending, to the controller associated with the first application, a message indicating that the connection cannot be established such that the traffic is handled according to the threshold service level.

In some examples, it may be determined that the connection cannot be established such that the traffic is handled according to the threshold service level, and the method may include identifying a second route of the one or more routes, the second route associated with a second service level that is less than the threshold service level. As such, the message sent to the controller may further include an offer to establish the connection such that the traffic is sent or received using the second route.

Additionally, or alternatively, based at least in part on determining that the connection cannot be established, the method may include causing the second networking technology to provision a second route that meets or exceeds the threshold service level. As such, the connection may be established for use by the first application such that the traffic is sent or received using the second route.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
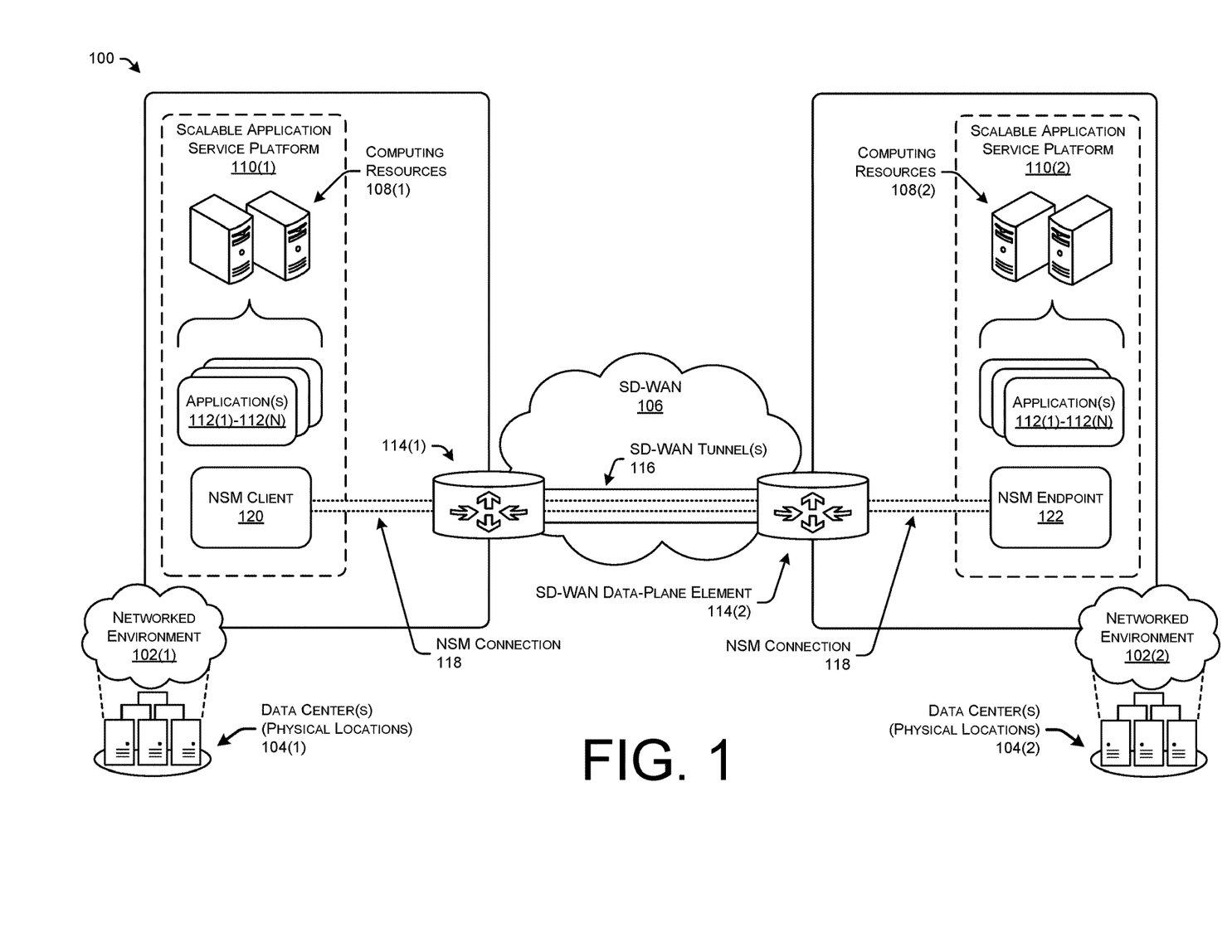
FIG. 1 is a system-architecture diagram illustrating an example architecture in which a network service mesh is built on top of a software-defined wide area network.

FIG. 1 is a system-architecture diagram illustrating an example architecture 100 in which a network service mesh (NSM) is built on top of an existing software-defined wide area network (SD-WAN) 106. The architecture 100 may include a first networked environment 102(1) and a second networked environment 102(2) that are communicatively connected with one another via the SD-WAN 106. The first networked environment 102(1) and the second networked environment 102(2) may each be located within one or more data center(s) 104(1) and 104(2) (hereinafter referred to collectively as "data centers 104"). The one or more data center(s) 104 may be physical facilities or buildings located across geographic areas that are designated to store computing resources 108(1) and 108(2) that may be part of the scalable application service platforms 110(1) and 110(2). The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), networking (bandwidth), security, and the like. However, in some examples the devices of the networked environments 102 may not be located in explicitly defined data centers 104 but may be located in other locations or buildings.

The scalable application service platforms 110(1) and 110(2) (hereinafter referred to collectively as "scalable application service platforms 110") may host one or more third-party applications, virtual machines, containers, and the like using infrastructure (e.g., physical devices, such as the computing resources 108) of the networked environments 102 that are allocated to the scalable application service platform 110. For instance, the scalable application service platforms 110 may be container-orchestration systems such as, for example, Kubernetes, Amazon ECS, Docker Swarm, Apache Mesos, and the like. The computing resources 108 of the scalable application service platforms 110 may be used to host one or more applications 112(1)-112(N) (hereinafter referred to collectively as "applications 112") (where "N" represents any number greater than or equal to one). The computing resources 108 may comprise hardware servers, software servers that are running on computer hardware, processors, general purpose computers, and the like. In some examples, the scalable application service platforms 110 may comprise multiple service platforms or data centers that are located in different geographical regions, different networks, etc. That is, although two instances of the scalable application service platforms 110 are shown in FIG. 1 for illustration purposes, it should be appreciated that the SD-WAN 106 may facilitate communication of traffic for multiple instances of the scalable application service platforms 110. For instance, the computing resources 108 and/or the applications 112 may be distributed between different data centers 104 associated with the scalable application service platforms 110, different networks associated with the scalable application service platforms 110, different zones of a cloud service provider, and the like.

The networked environments 102(1) and 102(2) each include SD-WAN data-plane elements 114(1) and 114(2) (hereinafter referred to collectively as "SD-WAN data-plane elements 114"). The SD-WAN data-plane elements 114 may be any physical or virtual device capable of forwarding packets. For instance, the SD-WAN data-plane elements 114 may be routers, switches, general purpose computers, software nodes, gateways, cloud-native network functions, and/or any other networking device capable of forwarding packets through the SD-WAN 106. The SD-WAN 106 may facilitate the communication of traffic between the applications 112 of the scalable application service platforms 110(1) and 110(2). The SD-WAN data-plane elements 114 may forward traffic through the SD-WAN 106 via one or more SD-WAN tunnel(s) 116. In some examples, respective SD-WAN tunnel(s) 116 may be associated with respective service levels (e.g., QoS levels).

As noted above, FIG. 1 illustrates and example in which an existing SD-WAN 106 is used to implement an NSM connection 118 on top of the SD-WAN 106. The NSM connection 118 is built on top of an SD-WAN 106 using APIs exposed by the SD-WAN management and controlplanes. In some examples, the NSM connection may have points of presence (PoPs) or data-plane elements where the SD-WAN data-plane elements are co-located with NSM resources. The SD-WAN data plane elements 114 may be located in the networked environments 102 and/or the data centers 104 where the scalable application service platforms 110 are hosted for cloud-native applications 112. NSM data-plane elements, such as the NSM client 120 and the NSM endpoint 122, may run on the scalable application service platforms 110 and expose APIs that allow the applications 112 to request specific QoS parameters for their traffic or specify a given software-as-a-service (SaaS) they are interested in connecting to (e.g., Office 365, etc.). In this way, when a request comes in a the NSM client 120, the NSM may either establish the NSM connection 118 to the remote NSM endpoint 122 over the SD-WAN tunnel 116 if the SD-WAN tunnel meets the QoS requirements.

In some examples, if the request cannot be fulfilled the NSM may offer a different NSM connection 118 over an SD-WAN tunnel 116 that is closest to fulfilling the QoS requirements and inform the application 112 of the exact QoS/tunnel characteristics (e.g., read from an SDN controller or vManage). As such, the application 112 may decide to adapt behavior to this lower service level and use the connection offered by NSM. The advantage of this is that the application 112 may know what service level(s) are available and adjust its behavior accordingly.

Additionally, or alternatively, the NSM may trigger one or more appropriate control-plane operations via an API of the SD-WAN 106 to request the SD-WAN 106 to provision a tunnel 116 that meets the application requirements. In some instances, this process may happen dynamically and NSM may automatically release SD-WAN resources when they are no longer needed to meet the requirements of the application.

Figure 2:
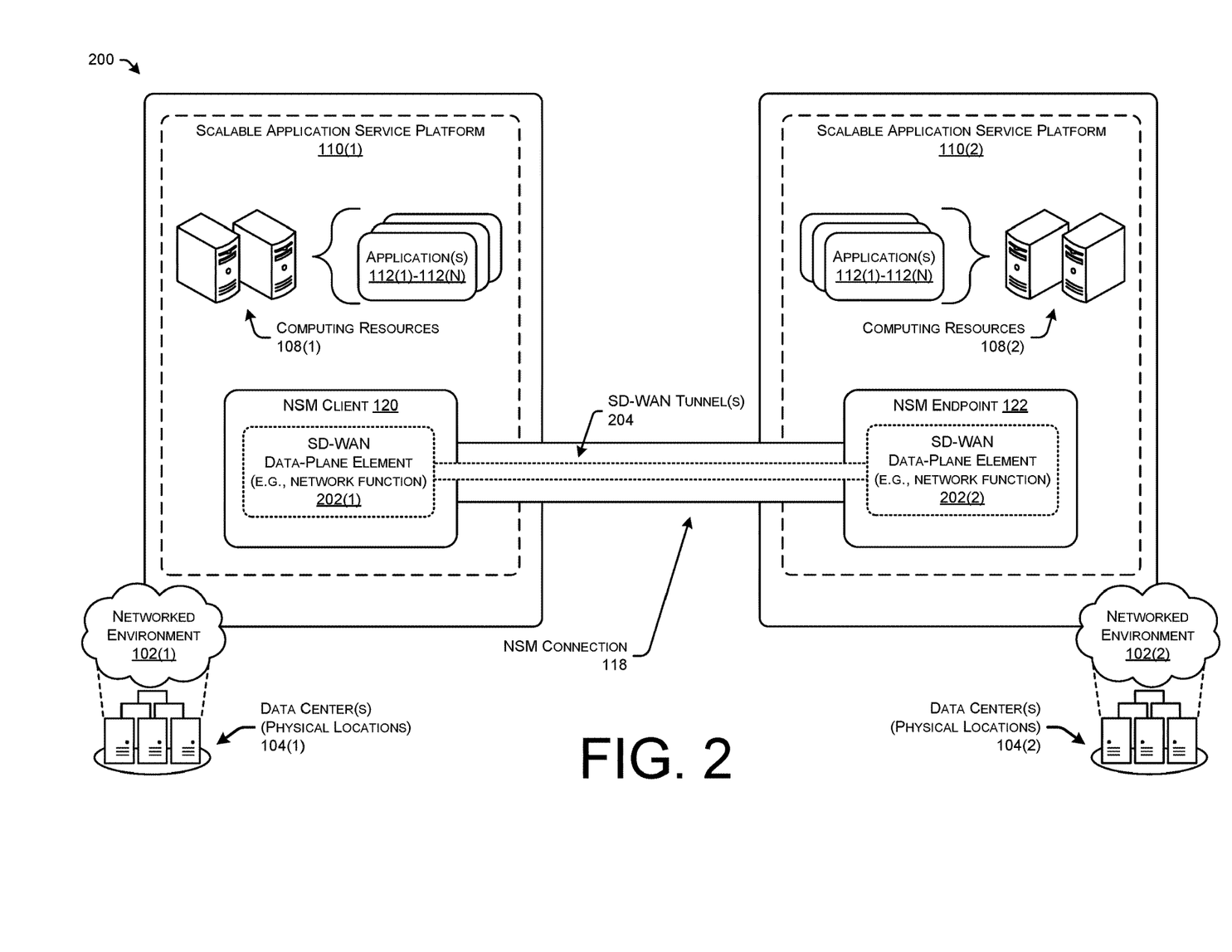
FIG. 2 is a system-architecture diagram illustrating an example architecture in which a software-defined wide area network is built on top of a network service mesh.

FIG. 2 is a system-architecture diagram illustrating an example architecture 200 in which a software-defined wide area network (SD-WAN) is built on top of an existing network service mesh (NSM) connection 118, which can includes NSM clients 120 and NSM endpoints 122. The architecture 200 may include the first networked environment 102(1) and second networked environment 102(2) that are communicatively connected with one another via the existing NSM connection 118. The first networked environment 102(1) and the second networked environment 102(2) may each be located within the one or more data center(s) 104(1) and 104(2).

As noted above, this architecture 200 may be appropriate for enterprises that are more advanced in their cloud-native journey. For instance, these enterprises may be using several different cloud providers, data centers 104, and/or on-premises computing/networking resources, with an existing NSM 118 connecting them for multi-cloud usage. As such, the NSM may be leveraged to create the SD-WAN solution. In some examples, this may require cloud-native, containerized layer-3 network switching/routing solutions (e.g., cloud-native network functions), which may act as the SD-WAN data-plane elements 202(1) and 202(2) (hereinafter referred to collectively as "SD-WAN data-plane elements 202"). In some instances, the NSM 118 may monitor several parameters of these SD-WAN data-plane elements 202 and the logical link(s) between them (e.g., the SD-WAN tunnel(s) 204), such as total/available capacity, number and type of flows, latency, jitter, packet loss, and the like. With this approach, a cloud-native, SD-WAN solution may be created on top of an existing, cloud-native NSM connection 118 such that microservices-based applications 112 may have granular control over the required type of WAN network connectivity.

In the architecture 200, the existing NSM connection 118 may be running in the scalable application service platforms 110 hosted in the different cloud providers or data centers 104. In some instances, a cloud-native network function capable of advanced switching/routing may be used as the SD-WAN data-plane elements 202 for traffic forwarding between the NSM client 120 and the NSM endpoint 122. In at least one example, the way requests from applications 112 work may be the same as in the architecture 100 described with respect to FIG. 1, with the main difference being that since the SD-WAN data-plane elements 202 are cloud-native, SDN controller operations can be integrated into the cloud-native application 112 and the NSM connection 118 itself. This may effectively make NSM the SD-WAN solution. In other words, the SDN controller could be used to orchestrate the NSM client 120 and the NSM endpoint 122 to offer the SD-WAN-like solution natively integrated within the application microservices.

Figure 3:
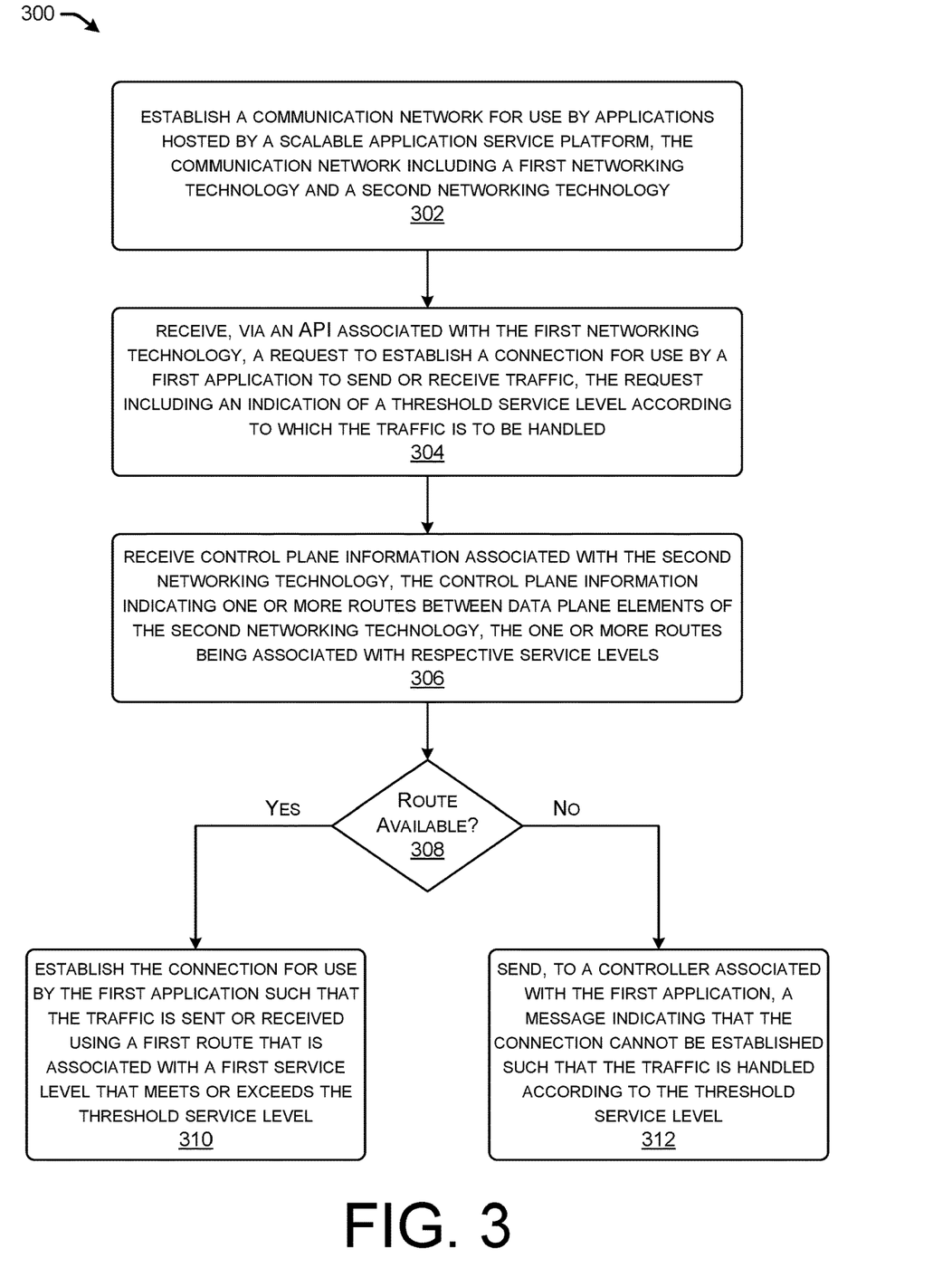
FIG. 3 is a flow diagram illustrating an example method for using application network requirements and/or telemetry information from a first networking technology to enhance operation of a second networking technology and optimize WAN traffic.

FIG. 3 is a flow diagram illustrating an example method 300 for using application network requirements and/or telemetry information from a first networking technology to enhance operation of a second networking technology and optimize WAN traffic. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes establishing a communication network for use by applications hosted by a scalable application service platform, the communication network including a first networking technology and a second networking technology. For instance, the communication network may be established between the first networked environment 102(1) and the second networked environment 102(2) such that the applications 112 may send or receive traffic. Additionally, the first networking technology may be an NSM and the second networking technology may be SD-WAN.

At operation 304, the method 300 includes receiving, via an API associated with the first networking technology, a request to establish a connection for use by a first application to send or receive traffic, the request including an indication of a threshold service level according to which the traffic is to be handled. For instance, an API of the NSM 118 may receive the request from a controller associated with the first application 112.

At operation 306, the method 300 includes receiving control plane information associated with the second networking technology, the control plane information indicating one or more routes between data plane elements of the second networking technology, the one or more routes being associated with respective service levels. For instance, the API of the NSM 118 may receive the control plane information from the SD-WAN 106, and the control plane information may be indicative of the one or more SD-WAN tunnel(s) 116 through the SD-WAN 106. Additionally, each one of the SD-WAN tunnel(s) 116 may be associated with a specific service level or QoS.

At operation 308, the method 300 includes determining whether a route is available that meets or exceeds the threshold service level. For instance, the NSM 118 may determine whether an SD-WAN tunnel 116 that meets or exceeds the threshold service level is available for the application to send or receive traffic. If there is a route available, the method 300 proceeds to operation 310. However, if there is not a route available, the method 300 proceeds to operation 312.

At operation 310, the method includes establishing the connection for use by the first application such that the traffic is sent or received using a first route that is associated with a first service level that meets or exceeds the threshold service level. For instance, the NSM connection 118 may be established through a first SD-WAN tunnel 116 that is associated with a service level that meets or exceeds the threshold service level. In this way, the traffic is also sent through the first SD-WAN tunnel 116.

At operation 312, the method 300 includes send, to a controller associated with the first application, a message indicating that the connection cannot be established such that the traffic is handled according to the threshold service level. For instance, the NSM 118 or an API of the NSM 118 may send the message to the controller associated with the application 112 to indicate that the connection cannot be established. Additionally, or alternatively, the NSM 118 or the API of the NSM 118 may send a message to the controller to indicate an alternative route that may be used, even if the route does not meet the threshold service level.

Figure 4:
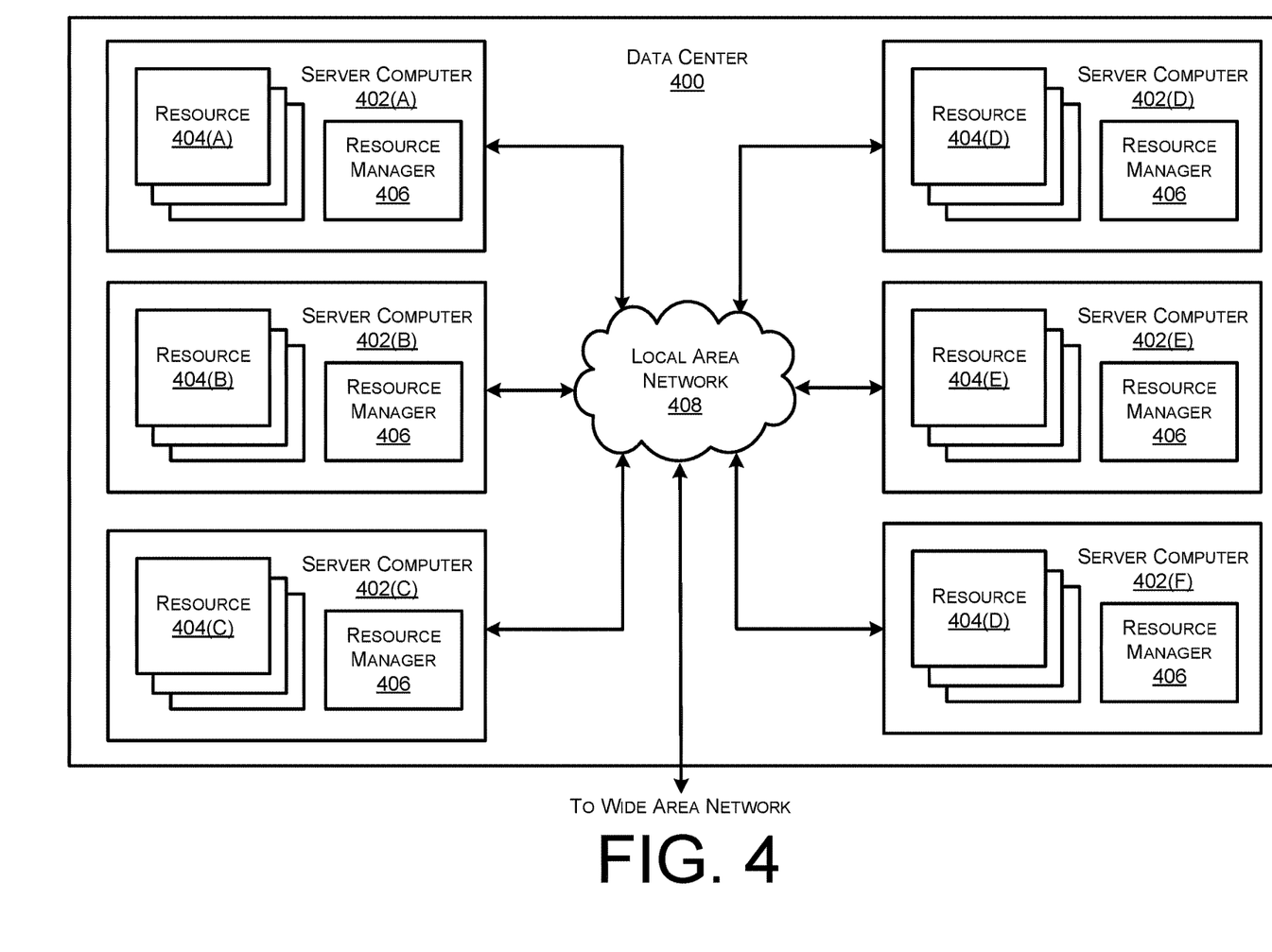
FIG. 4 is a computing system diagram illustrating an example configuration of a data center that can be utilized to implement aspects of the technologies disclosed herein.

FIG. 4 is a computing system diagram illustrating an example configuration of a data center 400 that can be utilized to implement aspects of the technologies disclosed herein. The example data center 400 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, any type of networked device or node described herein. Although described as servers, the server computers 402 may comprise any type of networked device, such as servers, switches, routers, hubs, bridges, gateways, modems, repeaters, access points, etc.

The server computers 402 can be standard tower, rack-mount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, security, packet inspection, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate local area network (LAN) 408 is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402F in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more application containers and/or virtual machines to perform techniques described herein. In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
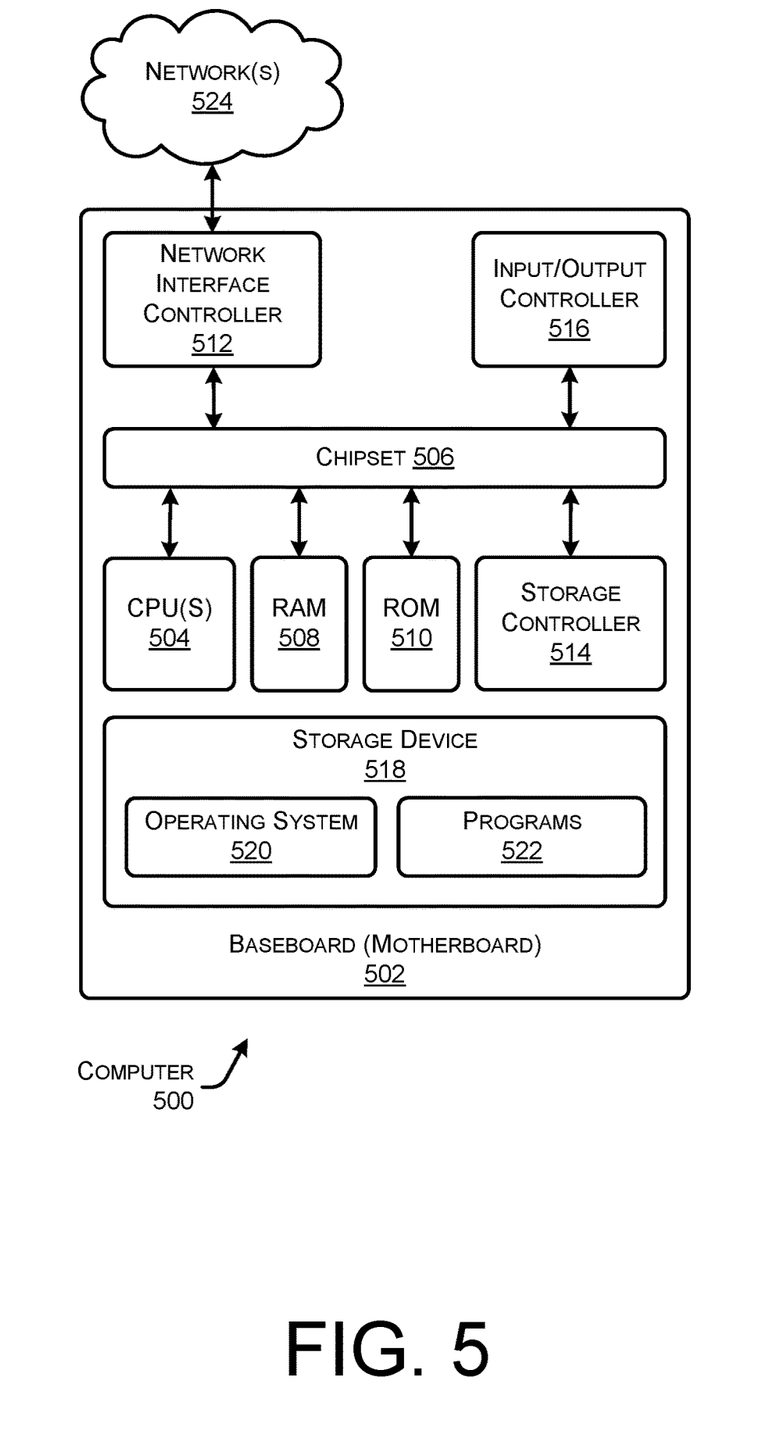
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, data plane element, network node, router, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 106. The chipset 506 can include functionality for providing network connectivity through a NIC 512, such as a gigabit Ethernet adapter. The NIC 512 is capable of connecting the computer 500 to other computing devices over the network 524 and/or network 102. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architectures 100 and 200 and or any components included therein, may be supported by one or more devices similar to computer 500. Stated otherwise, some or all of the operations performed by the architectures 100 and 200, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the source device 106 and network device 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for using application network requirements and/or telemetry information from a first networking technology to enhance operation of a second networking technology and optimize WAN traffic. The programs 522 may enable the SD-WAN 106 and the NSM 118, as well as their associated components, to perform the various operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    establishing a communication network for use by cloud-native applications hosted by a scalable application service platform, the communication network including a first wide area network (WAN) transport technology on top of a second WAN transport technology that is different from the first WAN transport technology;
    receiving, via an application programming interface (API) associated with the first WAN transport technology, a request to establish a communication session for use by a first application of the cloud-native applications to communicate, over the communication network, with a resource associated with the application, the request including an indication of a threshold service level according to which traffic of the communication session is to be handled;

receiving control plane information associated with the second WAN transport technology, the control plane information indicating one or more routes between data plane elements of the second WAN transport technology and respective service levels associated with each one of the one or more routes;

determining, based at least in part on the control plane information, a first route of the one or more routes that is optimized for the traffic of the communication session and that has a first service level that meets or exceeds the threshold service level; and establishing the communication session for use by the first application such that the traffic is sent or received using the first route.

2. The method of claim 1, wherein the first WAN transport technology is a-network service mesh and the second WAN transport technology is a software-defined wide area network (SD-WAN).

3. The method of claim 1, wherein the first WAN transport technology is built on top of the second WAN transport technology using one or more APIs exposed by a control plane of the second WAN transport technology.

4. The method of claim 1, further comprising:
determining that the communication session cannot be established such that the traffic is handled according to the threshold service level;
identifying a second route of the one or more routes, the second route associated with a second service level that is less than the threshold service level; and
sending, to a controller associated with the first application, a message indicating an offer to establish the communication session such that the traffic is sent or received using the second route.

5. The method of claim 1, further comprising:
determining that the communication session cannot be established such that the traffic is handled according to the threshold service level;
based at least in part on determining that the communication session cannot be established, causing the second WAN transport technology to provision a second route that meets or exceeds the threshold service level; and
establishing the communication session for use by the first application such that the traffic is sent or received using the second route.

6. The method of claim 1, wherein the threshold service level is associated with one or more quality of service (QoS) parameters, the QOS parameters including at least one of a data rate, a latency, jitter, or packet loss.

7. The method of claim 1, wherein determining the first route that is optimized for the traffic is further based at least in part on control plane information associated with the first WAN transport technology.

8. A system comprising:
one or more processors; and
one or more non-transitory computer-readable media storing instructions that, when executed by the one or more processors, cause the system to perform operations comprising:
establishing a communication network for use by cloud-native applications hosted by a scalable application service platform, the communication network including a first wide area network (WAN) transport technology on top of a second WAN transport technology that is different from the first WAN transport technology;

receiving, via an application programming interface (API) associated with the first WAN transport technology, a request to establish a communication session for use by a first application of the cloud-native applications to communicate, over the communication network, with a resource associated with the application, the request including an indication of a threshold service level according to which traffic of the communication session is to be handled;

receiving control plane information associated with the second WAN transport technology, the control plane information indicating one or more routes between data plane elements of the second WAN transport technology and respective service levels associated with each one of the one or more routes;

determining, based at least in part on the control plane information, a first route of the one or more routes that is optimized for the traffic of the communication session and that has a first service level that meets or exceeds the threshold service level; and establishing the communication session for use by the first application such that the traffic is sent or received using the first route.

9. The system of claim 8, wherein the first WAN transport technology is a network service mesh and the second WAN transport technology is a software-defined wide area network (SD-WAN).

10. The system of claim 8, wherein the first WAN transport technology is built on top of the second WAN transport technology using one or more APIs exposed by a control plane of the second WAN transport technology.

11. The system of claim 8, the operations further comprising:
determining that the communication session cannot be established such that the traffic is handled according to the threshold service level;
identifying a second route of the one or more routes, the second route associated with a second service level that is less than the threshold service level; and
sending, to a controller associated with the first application, a message indicating an offer to establish the communication session such that the traffic is sent or received using the second route.

12. The system of claim 8, the operations further comprising:
determining that the communication session cannot be established such that the traffic is handled according to the threshold service level;
based at least in part on determining that the communication session cannot be established, causing the second WAN transport technology to provision a second route that meets or exceeds the threshold service level; and
establishing the communication session for use by the first application such that the traffic is sent or received using the second route.

13. The system of claim 8, wherein the threshold service level is associated with one or more quality of service (QoS) parameters, the QOS parameters including at least one of a data rate, a latency, jitter, or packet loss.

14. The system of claim 8, wherein determining the first route that is optimized for the traffic is further based at least in part on control plane information associated with the first WAN transport technology.

15. One or more non-transitory computer-readable media storing instructions that, when executed by one or more processors, cause the one or more processors to perform operations comprising:
   establishing a communication network for use by cloud-native applications hosted by a scalable application service platform, the communication network including a first wide area network (WAN) transport technology on top of a second WAN transport technology that is different from the first WAN transport technology;
   receiving, via an application programming interface (API) associated with the first WAN transport technology, a request to establish a communication session for use by a first application of the cloud-native applications to communicate, over the communication network, with a resource associated with the application, the request including an indication of a threshold service level according to which traffic of the communication session is to be handled;
   receiving control plane information associated with the second WAN transport technology, the control plane information indicating one or more routes between data plane elements of the second WAN transport technology and respective service levels associated with each one of the one or more routes;
   determining, based at least in part on the control plane information, a first route of the one or more routes that is optimized for the traffic of the communication session and that has a first service level that meets or exceeds the threshold service level; and
   establishing the communication session for use by the first application such that the traffic is sent or received using the first route.

16. The one or more non-transitory computer-readable media of claim 15, wherein the first WAN transport technology is a network service mesh and the second WAN transport technology is a software-defined wide area network (SD-WAN).

17. The one or more non-transitory computer-readable media of claim 15, wherein the first WAN transport technology is built on top of the second WAN transport technology using one or more APIs exposed by a control plane of the second WAN transport technology.

18. The one or more non-transitory computer-readable media of claim 15, the operations further comprising:
   determining that the communication session cannot be established such that the traffic is handled according to the threshold service level;
   identifying a second route of the one or more routes, the second route associated with a second service level that is less than the threshold service level; and
   sending, to a controller associated with the first application, a message indicating an offer to establish the communication session such that the traffic is sent or received using the second route.

19. The one or more non-transitory computer-readable media of claim 15, the operations further comprising:
   determining that the communication session cannot be established such that the traffic is handled according to the threshold service level;
   based at least in part on determining that the communication session cannot be established, causing the second WAN transport technology to provision a second route that meets or exceeds the threshold service level; and
   establishing the communication session for use by the first application such that the traffic is sent or received using the second route.

20. The one or more non-transitory computer-readable media of claim 15, wherein determining the first route that is optimized for the traffic is further based at least in part on control plane information associated with the first WAN transport technology.

* * * * *